US007680848B2

(12) United States Patent
Janedittakarn et al.

(10) Patent No.: US 7,680,848 B2
(45) Date of Patent: Mar. 16, 2010

(54) RELIABLE AND SCALABLE MULTI-TENANT ASYNCHRONOUS PROCESSING

(75) Inventors: Akezyt Janedittakarn, Bellevue, WA (US); Alexander Tkatch, Sammamish, WA (US); Arash Ghanaie-Sichanie, Bothell, WA (US); Michael James Ott, Redmond, WA (US); David Robert Shutt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 11/729,582

(22) Filed: Mar. 29, 2007

(65) Prior Publication Data

US 2008/0243867 A1 Oct. 2, 2008

(51) Int. Cl.
*G06F 17/30* (2006.01)
(52) U.S. Cl. .................. 707/613; 709/105; 709/227
(58) Field of Classification Search ................. 707/204; 709/105, 200, 201, 238, 227, 232, 313
See application file for complete search history.

(56) References Cited

U.S. PATENT DOCUMENTS

| 7,373,500 | B2 * | 5/2008 | Ramelson et al. | 713/150 |
| 7,475,157 | B1 * | 1/2009 | Tormasov | 709/238 |
| 2001/0034752 | A1 * | 10/2001 | Kremien | 709/105 |
| 2002/0026502 | A1 * | 2/2002 | Phillips et al. | 709/219 |
| 2002/0112087 | A1 * | 8/2002 | Berg | 709/313 |
| 2002/0116397 | A1 * | 8/2002 | Berg | 707/200 |
| 2003/0023743 | A1 * | 1/2003 | Raphel et al. | 709/232 |
| 2004/0210663 | A1 * | 10/2004 | Phillips et al. | 709/230 |
| 2004/0250059 | A1 * | 12/2004 | Ramelson et al. | 713/150 |
| 2005/0060414 | A1 * | 3/2005 | Phillips et al. | 709/227 |
| 2005/0060427 | A1 * | 3/2005 | Phillips et al. | 709/238 |
| 2007/0061470 | A1 * | 3/2007 | Berg | 709/227 |
| 2008/0189350 | A1 * | 8/2008 | Vasa et al. | 709/201 |

* cited by examiner

*Primary Examiner*—Don Wong
*Assistant Examiner*—Sheree N Brown
(74) *Attorney, Agent, or Firm*—Merchant & Gould P.C.

(57) ABSTRACT

In a multi-tenant environment, synchronous processing requests from clients associated with tenants are handled by middle tier servers, which forward requests for asynchronous processing to queues associated with organizational databases for each tenant directed by a locator service. A group of independent asynchronous processing servers are used to perform the asynchronous processing interacting with the databases in a distributed manner. The allocation of the requests among the asynchronous servers is managed by an exponential back off for organizations with no waiting requests algorithm combined with a quota system based on historic load for organizations that have requests. The independence of the synchronous and asynchronous processing servers, as well as the distributed interaction between the asynchronous processing servers and the databases enables scalability of the system based on request types and implementation of reliable recovery mechanisms.

17 Claims, 7 Drawing Sheets

EXAMPLE SYNCHRONOUS / ASYNCHRONOUS PROCESSING

EXAMPLE SCALABLE GROUP
WITH ASYNCH. PROCESSING

EXAMPLE CRM SYSTEM WITH
ASYNCH. PROCESSING
BLOCK DIAGRAM

RELIABLE AND SCALABLE MULTI-TENANT ASYNCHRONOUS PROCESSING

BACKGROUND

In hosted computer applications servicing a large number of customers on shared hardware (referred to as a multi-tenant system), where requests for processing are asymmetric, a need to process longer running requests at different priorities may arise. Furthermore, the servicing of multiple customers on shared hardware requires that the system behave 'fairly' with respect to handling requests from different customers.

Customer Relationship Management (CRM) solutions provide tools and capabilities needed to create and maintain a clear picture of customers, from first contact through purchase and post-sales, typically in a hosted computer application environment. For complex organizations, a CRM system may provide features and capabilities to help improve the way sales and marketing organizations target new customers, manage marketing campaigns, and drive sales activities. CRM systems may include many components, hardware and software, utilized individually or in a shared manner by users internal or external to the organization.

Thus, a typical CRM system that hosts multiple customers ("tenants") may process a large number of requests for data from a variety of data sources utilizing a plurality of servers. With at least a portion of the data stores and/or servers being dedicated to particular tasks or tenant organizations, providing reliable service with optimized performance is a challenging task.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to providing scalable asynchronous processing services in a multi-tenant environment. Synchronous processing requests from tenants are handled by middle tier servers, which forward requests for asynchronous processing to queues associated with organizational databases for each tenant. A group of independent asynchronous processing servers are used to perform the asynchronous processing interacting with the databases in a distributed manner. The independence of the synchronous and asynchronous processing servers, as well as the distributed interaction between the asynchronous processing servers and the databases enables scalability of the system based on request types and implementation of failure-safe recovery mechanisms.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, scalable and reliable multi-tenant systems may be implemented by distributing synchronous and asynchronous processing requests between independent groups of servers that interact with organizational databases through a locator service. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
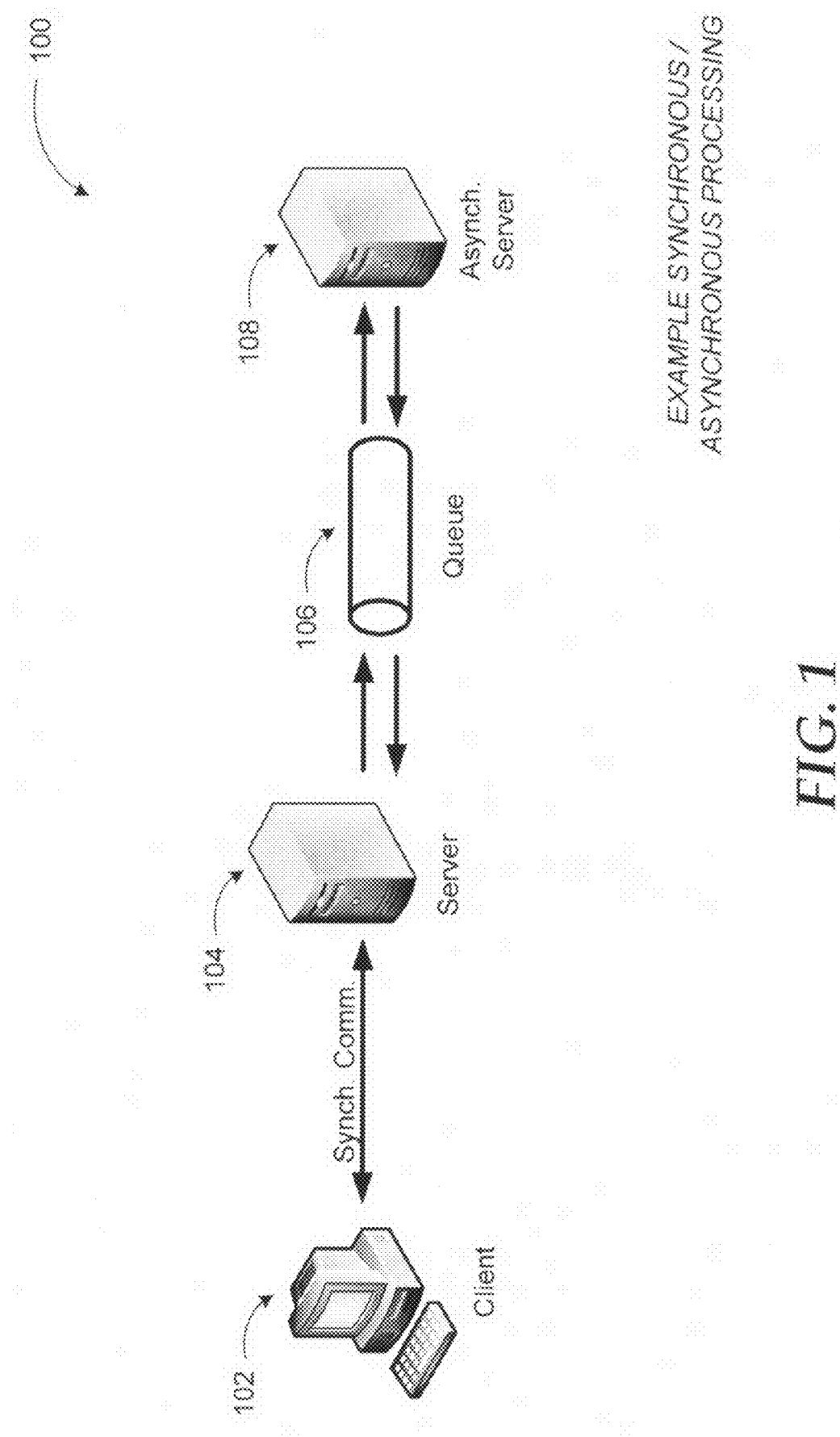
FIG. 1 is a diagram illustrating example synchronous and asynchronous processing between a client and servers.

Referring to FIG. 1, diagram 100 of example synchronous and asynchronous processing between a client and servers is illustrated. Synchronous and asynchronous processing may be performed in many topologic settings between clients and servers (each of which may be virtual or physical).

The basic configuration in FIG. 1 shows client 102 communicating with server 104 for synchronous processing, which is typically handled by the same server in real time. On the other hand, requests for asynchronous processing from client 102 are forwarded to a queue 106 by server 104. Queue 106 maintains the requests according to a prioritization scheme (first-come-first-serve or other schemes) and provides them to asynchronous server 108. As responses are received from asynchronous server 108 and provided back to the requesting client through server 104, the order of pending requests in queue 106 is adjusted accordingly.

Figure 2:
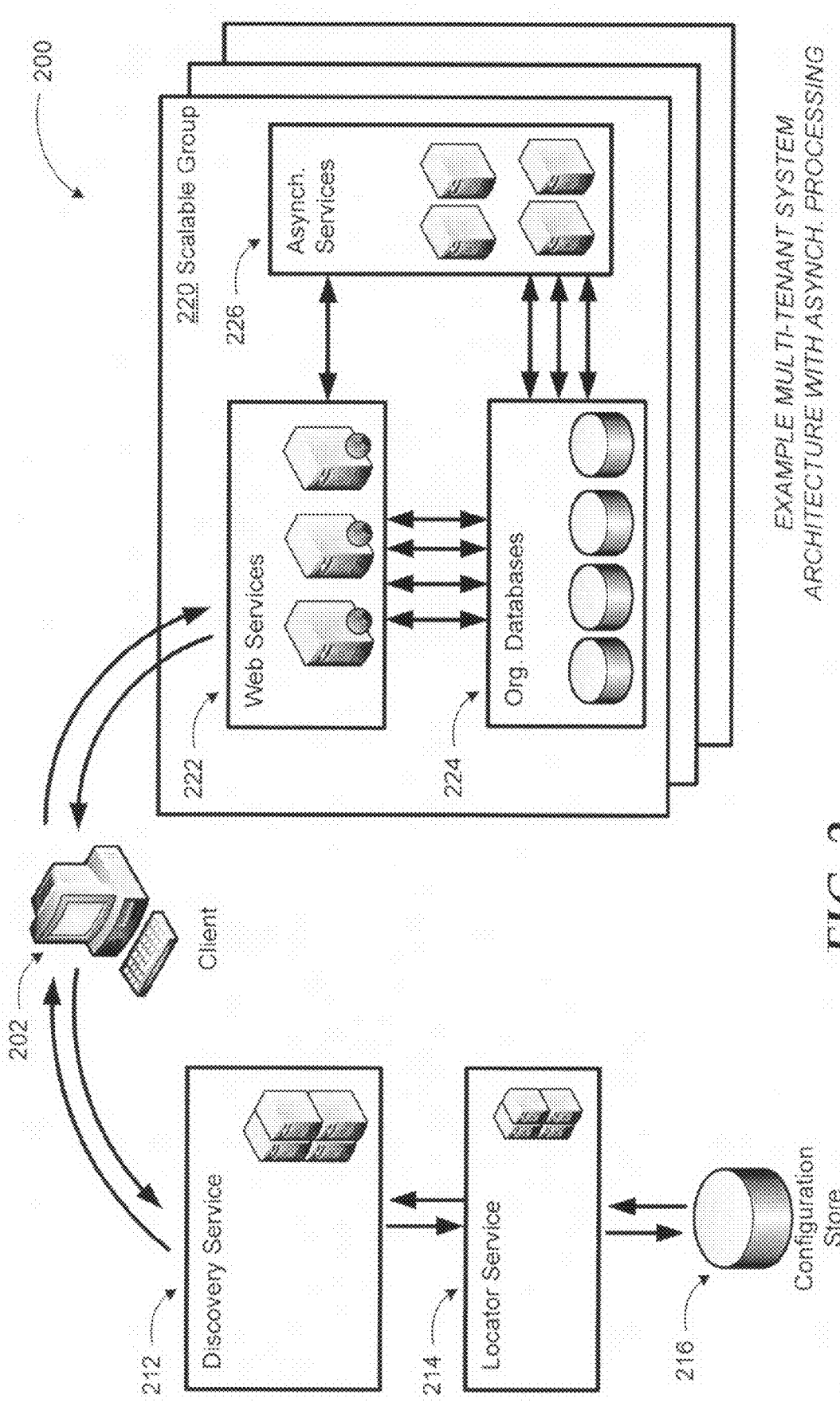
FIG. 2 illustrates an example multi-tenant system architecture with asynchronous processing.

FIG. 2 illustrates the architecture of example multi-tenant system 200 with asynchronous processing. In a typical multi-tenant system, clients associated with different tenants request operations from a service that include synchronous operations by one group of servers and/or asynchronous operations by another group of servers involving tenant-specific information from organization level databases.

In an operation, client 202 receives information from discovery service 212 regarding which service (or servers) in scalable group 220, it may talk to. According to other embodiments, client 202 may be provided credentials by discovery service 212 that enable it to communicate with web services 222 in scalable group 220. A particular server within web services 222 may be assigned to the client by random selection, according to a predefined algorithm (e.g. a load balancing algorithm), and the like.

In conjunction with the discovery service 202, locator service 204 may provide a purpose of the service and which databases of organization databases 224 may be used by a server of the web services 222. Organization databases 224 include separate virtual or physical databases for each of the organizations participating in the multi-tenant system. For example, a financial services system may include separate databases for each of the participating financial organizations (banks, etc.) that store account information, account access information, and so on. Information about the individual databases, their configuration, any redundancies, and the like, may be stored in configuration store 216. Configuration store 216 may further include data associated with the discovery and/or locator services.

When the request from the client is received at one of the servers of web services 222, a determination is made whether the request involves synchronous processing or asynchronous processing. The web servers may be stateless machines. If synchronous processing is requested, the web server itself may provide the service (although redundancies for fail-safe mechanisms may be built in). If asynchronous processing is requested, the request is provided to a queue associated with the appropriate organization database. The queue may be physically a part of the database. As the request comes up in the queue, one of the asynchronous servers is contacted for processing the request. A relationship between the asynchronous servers and the individual organization databases is a truly distributed one, where each server may work with any one of the databases. This distributed interaction between the asynchronous servers and the organization databases provides the ability to automatically recover from failures in the asynchronous processing machines by allowing the databases to connect to another available server when one fails.

As discussed below in more detail, an exponential back off algorithm for organizations with no waiting requests combined with a quota system based on historic load for organizations that have requests may be implemented according to further embodiments to optimize system performance by keeping overall system load to a minimum. The system can also keep up with varying quantities of work over time from the clients using the load distribution algorithm and the distributed server-database interaction.

Due to the independent distribution of synchronous and asynchronous work and the interaction between the servers and the databases, any part of the group is scalable. Thus, multiple instances of the servers (and/or databases) may be provided to address increased workload, additional organizations, data capacity, and so on.

Figure 3:
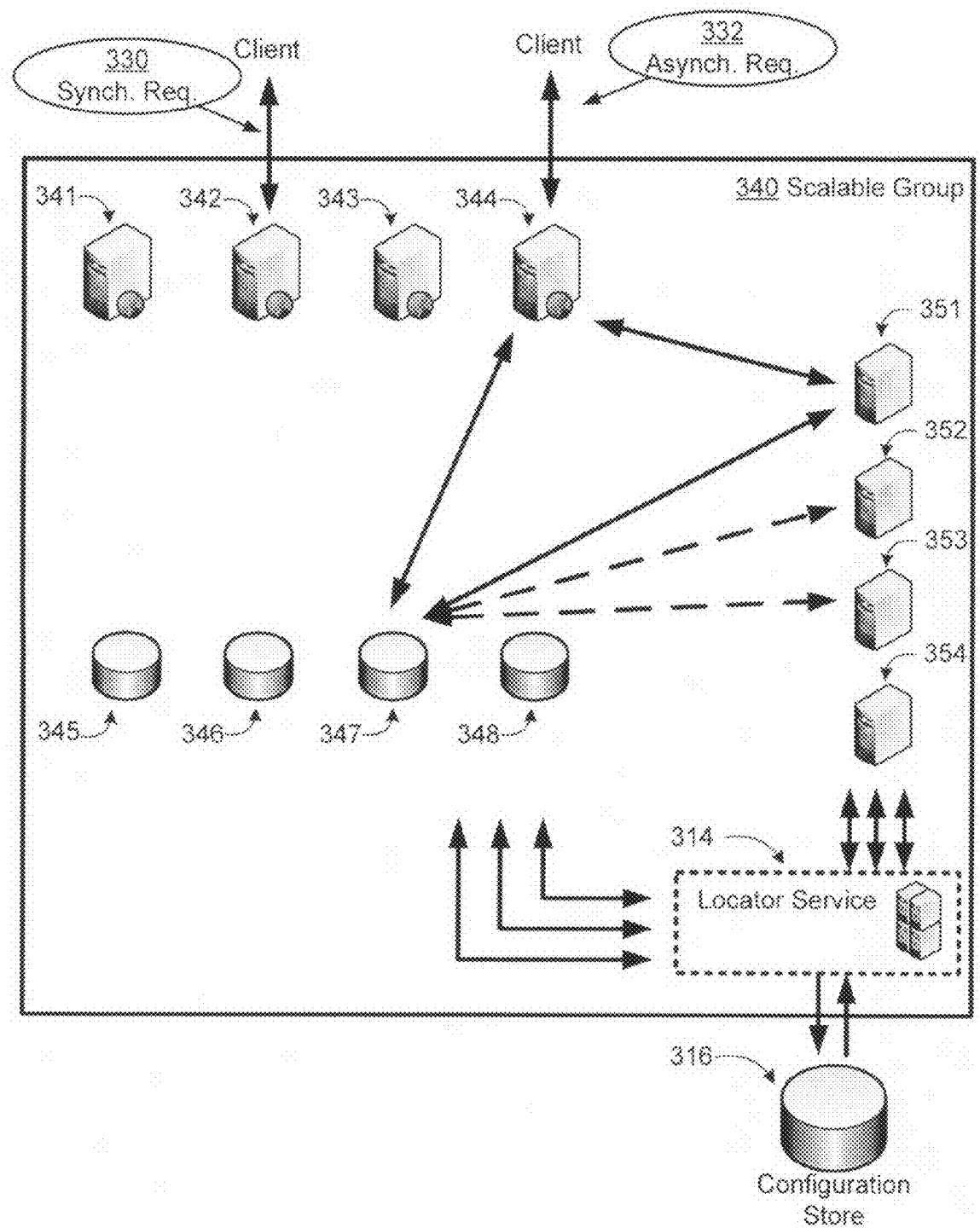
FIG. 3 illustrates an example scalable group with asynchronous processing within a multi-tenant system.

FIG. 3 illustrates example scalable group 340 with asynchronous processing within a multi-tenant system. Two example scenarios of processing client requests are also shown in the diagram.

According to a first scenario, a request that involves synchronous processing (330) is received from the client by web server 342 of the group of web servers (341-344). As mentioned above, the selection of web server 342 for the client request may be random or based on an algorithm. Because the request is for synchronous processing, it is handled by the web server itself and the response provided to the requesting client by the web server.

According to a second scenario, a request that involves asynchronous processing (332) is received from the client by web server 344. The client may belong to an organization ("tenant"), whose data is stored in database 347 of the database group (345-348). Locator service 314 in conjunction with configuration store 316 may provide information to web server 344 as to which database it needs to access. According to some embodiments, each database may also include a queue for keeping the asynchronous processing requests. Thus, the request from web server 344 is placed in the queue for database 347.

The databases (345-348) can interact with servers of the asynchronous cluster in a distributed manner enabling redundancies, failure recoveries, and efficient load distribution. Locator service 314, which may optionally be part of the scalable group 340, may also provide connection and status information about the databases to the asynchronous servers. When the request is picked up by one of the asynchronous servers from its queue at database 347, the processing is completed and the response provided to the client through the same web server. According to other embodiments, the web servers may also be redundant such that another web server may pick up the task of receiving the processed data from the database (or asynchronous server) and provide to the client, if the original web server is down.

Figure 4:
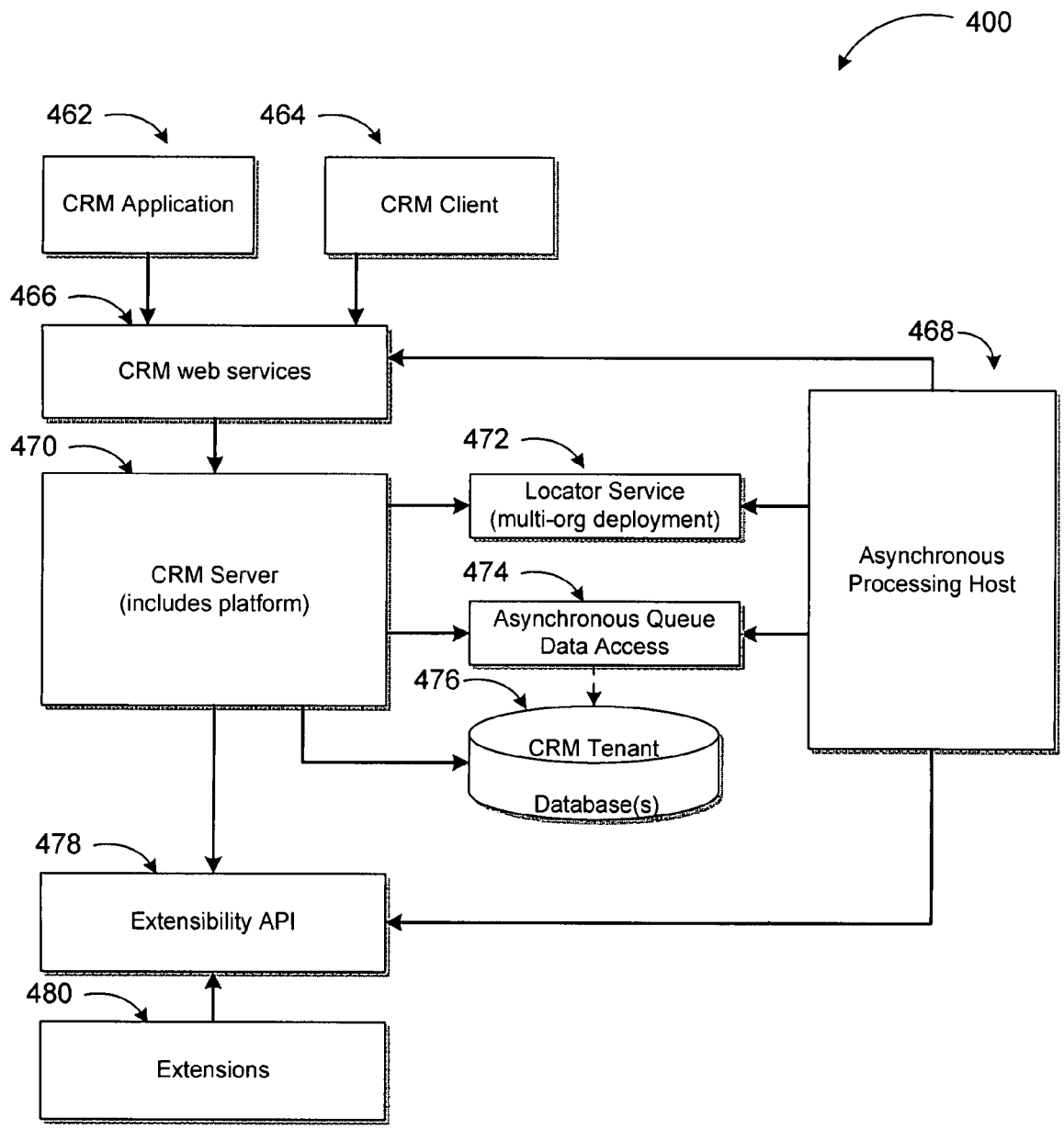
FIG. 4 is a block diagram of an example CRM system with asynchronous processing.

FIG. 4 is a block diagram of example CRM system 400 with asynchronous processing. Some CRM systems are an example of a multi-tenant system where customers are able to sign in to their 'organization' (tenant of the CRM system) which is logically their own database of CRM data. Customers can make requests that are short running in nature such as create an account, send an e-mail, or delete a contact. According to some embodiments, these requests may be processed synchronously on a cluster of 'middle tier' machines. Customers can also make requests that are long running in nature such as send bulk e-mail, start a business process (sometimes called workflow) that last the lifetime of an opportunity record, or import a large amount of data. These requests may be processed asynchronously on a cluster of 'asynchronous processing' machines. This approach enables independent scaling of short and long running requests. In order to handle more short running operations, machines may be added to the 'middle tier' cluster. In order to handle more long running operations, machines may be added to the 'asynchronous processing' cluster.

In a CRM system according to embodiments, each customer may be granted their own logical database (also called an organization). When customers make requests that are deemed by the system to be long running, they are recorded in a queue. The asynchronous processing cluster then determines when requests are waiting to be processed in each organization. This is accomplished by polling the organizations' queues. As a result, two problems may be encountered:

a large amount of requests to determine if an organization has any outstanding operations and the problem of determining how many requests to process at each polling interval from an organization. If too many are taken from one organization, another organization's requests may not be able to be processed (called starvation).

According to other embodiments, an algorithm addresses both challenges through a technique called exponential back off for organizations with no waiting requests combined with a quota system based on historic load for organizations that have requests. The algorithm for determining which customers have long-running operations pending optimizes system performance by keeping overall system load to a minimum and keeping up with varying quantities of work over time per customers.

Furthermore, it is common for customer requests to be treated uniformly regardless of their cost. Even when asynchronous processing is employed, it is commonly performed on the same hardware as the synchronous processing. By providing independent scaling of short running operations (synchronously on the middle tier cluster) and long running operations (asynchronously on the asynchronous host cluster), a multi-tenant system is enabled to be expanded to address the processing requests from clients based on the type of requests enabling tenants to be treated 'fairly" by the system.

Moreover, the distributed interaction between servers of the asynchronous cluster and the organization databases provides the ability to automatically recover from failures in the asynchronous processing machines by allowing the databases to connect to another available server when one fails.

Referring to FIG. 4, CRM application 462 is any application that uses CRM client 464 to send requests to CRM web services 466. CRM Server 470 is a collection of many CRM platform modules, exposed as CRM web services 466. Asynchronous Queue Data Access 474 is an Application Programming Interface (API) that provides access to the queue of asynchronous operations.

CRM tenant database(s) 476 are one or more physical or virtual databases that are used to store CRM metadata, entities, as well as asynchronous queue itself. As described above, locator service 472 is a service that provides an API to retrieve a list of organizations in a deployment. Asynchronous processing host 468 is a service application that invokes operations asynchronously. According to some embodiments, an external component may be used to execute workflow operations inside the asynchronous processing host 468. Extensibility API 478 is a collection of interfaces and classes that are released as part of CRM service and can be used by plug-in code. Extensions 480 are code blocks that implement synchronous as well as asynchronous operations.

In a multi-tenant deployment, there may be many instances of the CRM server and many instances of the asynchronous processing host. Due to a reliable queue implementation where long running requests are queued by the CRM server for later processing, each of these server clusters can be scaled independently.

According to some embodiments, a modified round-robin approach may be utilized to fetch pending requests from organizations' queues and not to create an overwhelming load of polling empty queues. The order to "visit" organizations may be randomized by each asynchronous host in order to avoid convoying behaviors across multiple hosts in a cluster. All states for each organization may be initialized to 0 (priority and wait-iterations). Such an algorithm may proceed as follows for each poll interval:

```
tick-capacity = max-capacity – currently-processing
if tick-capacity > 0 and currently-processing < poll-threshold
tick-priority-sum = Σ i=0...num-orgs max(0, orgi.priority + 1)
tick-capacity-per-priority = ceiling(tick-capacity / tick-priority-sum)
For each organization org in organizations-this-host-is-responsible-for
    if org.priority < 0 // This org is idle
        decrement org.wait-iterations
        if org.wait-iterations == 0
            if is-queue-empty(org)
                org.priority = max(org.priority – 1, min-priority)
                org.wait-iterations = back-off-base(org.priority)
            else
                org.priority = 0
    else // This org is not idle
        my-tick-capacity = (org.priority + 1) * tick-capacity-per-priority
        queue-items = dequeue(my-tick-capacity, org)
        if queue-items.count == my-tick-capacity
            // More items were left in the queue
            org.priority = min(org.priority + 1, max-priority)
        else if queue-items.count <= my-tick-capacity – tick-capacity-per-priority
            // org would have been satisfied with a lower priority
            decrement org.priority
            if org.priority < 0
                org.wait-iterations = 2abs(org.priority)
```

The algorithm may be optimized for each system by setting the following constants: poll-interval, poll-threshold, max-capacity, min-priority, and max-priority. These values may be parameterized for optimum operation. Thus, such an algorithm may have the affect of polling idle organizations less frequently and increasing the number of requests to 'dequeue' from an organization if the number dequeued last time was insufficient to keep up with the incoming rate for that organization (up to a maximum threshold in order to not be unfair to organizations with a much smaller incoming rate).

Figure 5:
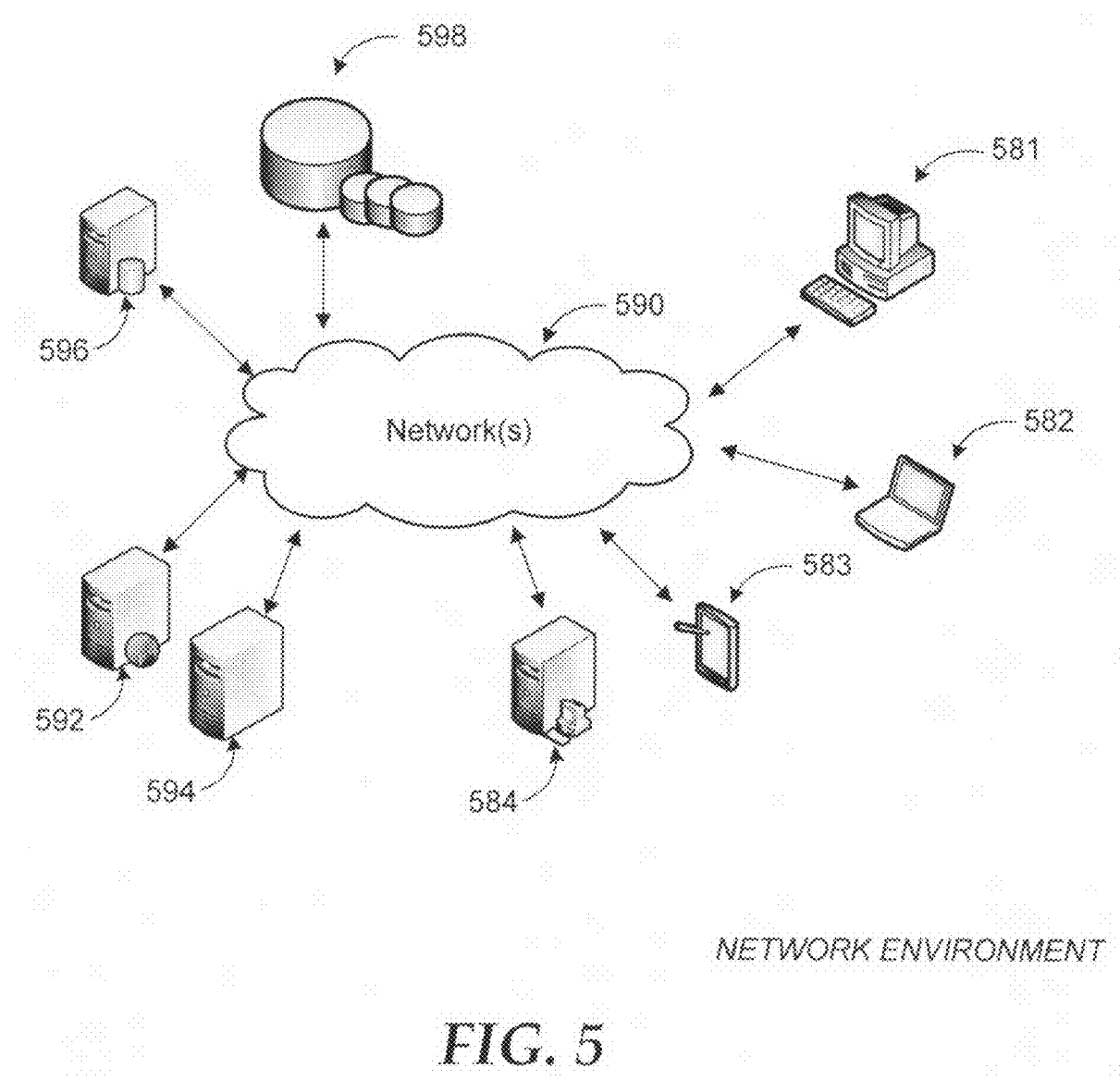
FIG. 5 is a diagram of an example networked environment, where embodiments may be implemented.

The scalable asynchronous processing systems and operations described in FIGS. 3, 4, and 5 are exemplary for illustration purposes. A system for providing asynchronous processing services in a multi-tenant environment may be implemented using additional or fewer components using the principles described herein.

FIG. 5 is an example networked environment, where embodiments may be implemented. Scalable asynchronous processing systems may be implemented in a distributed manner over a number of physical and virtual clients and servers. They may also be implemented in un-clustered systems or clustered systems employing a number of nodes communicating over one or more networks (e.g. network(s) 590).

Such a system may comprise any topology of servers, clients, Internet service providers, and communication media. Also, the system may have a static or dynamic topology. The term "client" may refer to a client application or a client device. While a networked system implementing scalable asynchronous processing may involve many more components, relevant ones are discussed in conjunction with this figure.

Requests for processing may come from tenants using individual client devices 581-583 or application server 584 in a networked multi-tenant system. Such a system may also be implemented, in one or more servers (e.g. servers 584, 594) and accessed by the client devices (or applications). One or more web servers (physical or virtual) such as web server 592 receive the requests and direct them to the appropriate resource. If the request is for synchronous processing, the web server(s) may handle the request directly. If the request is for asynchronous processing, web server 592 may involve asynchronous processing queues in organization databases and a group of asynchronous servers (e.g. server 594).

Organization databases may be embodied in a single data store such as data store 598 or distributed over a number of data stores. Dedicated database servers (e.g. database server 596) may be used to coordinate data retrieval and storage in one or more of such data stores.

Network(s) 590 may include a secure network such as an enterprise network, an unsecure network such as a wireless open network, or the Internet. Network(s) 590 provide communication between the nodes described herein. By way of example, and not limitation, network(s) 590 may include wired media such as a wired network or direct-wired connection, and wireless media such as acoustic, RF, infrared and other wireless media.

Many other configurations of computing devices, applications, data sources, data distribution systems may be employed to implement scalable multi-tenant asynchronous processing. Furthermore, the networked environments discussed in FIG. 5 are for illustration purposes only. Embodiments are not limited to the example applications, modules, or processes.

Figure 6:
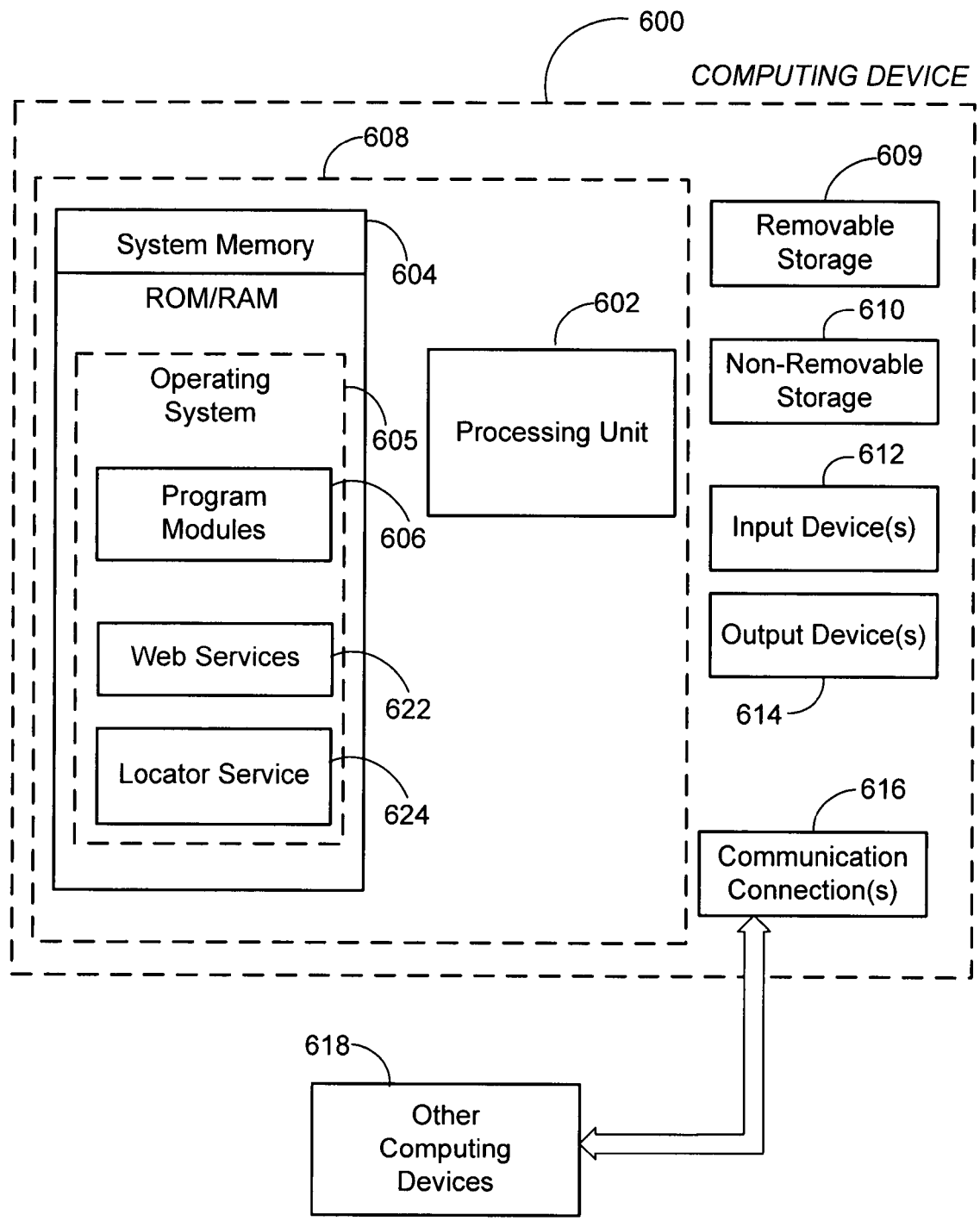
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment is illustrated, such as computing device 600. In a basic configuration, the computing device 600 may be a server providing services associated with scalable multi-tenant asynchronous processing and typically include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of a networked personal computer, such as the WINDOWS® operating systems from MICROSOFT CORPORATION of Redmond, Wash. The system memory 604 may also include one or more software applications such as program modules 606, Web services 622, and locator service 624.

Web services 622 may be a separate application or an integral module of a hosted multi-tenant service application that provides data and processing services to client applications associated with computing device 600. Locator service 624 may provide services associated with determining a purpose of the service and which databases to use for web servers, as well as asynchronous processing servers, as described previously. This basic configuration is illustrated in FIG. 6 by those components within dashed line 608.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and non-volatile, removable and non-removable media implemented in any method or technology for storage of information, such as computer readable instructions, data structures, program modules, or other data. System memory 604, removable storage 609 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 612 such as keyboard, mouse, pen, voice input device, touch input device, etc. Output device(s) 614 such as a display, speakers, printer, etc. may also be included. These devices are well known in the art and need not be discussed at length here.

The computing device 600 may also contain communication connections 616 that allow the device to communicate with other computing devices 618, such as over a wireless network in a distributed computing environment, for example, an intranet or the Internet. Other computing devices 618 may include server(s) that execute applications associated with a data access and directory service. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
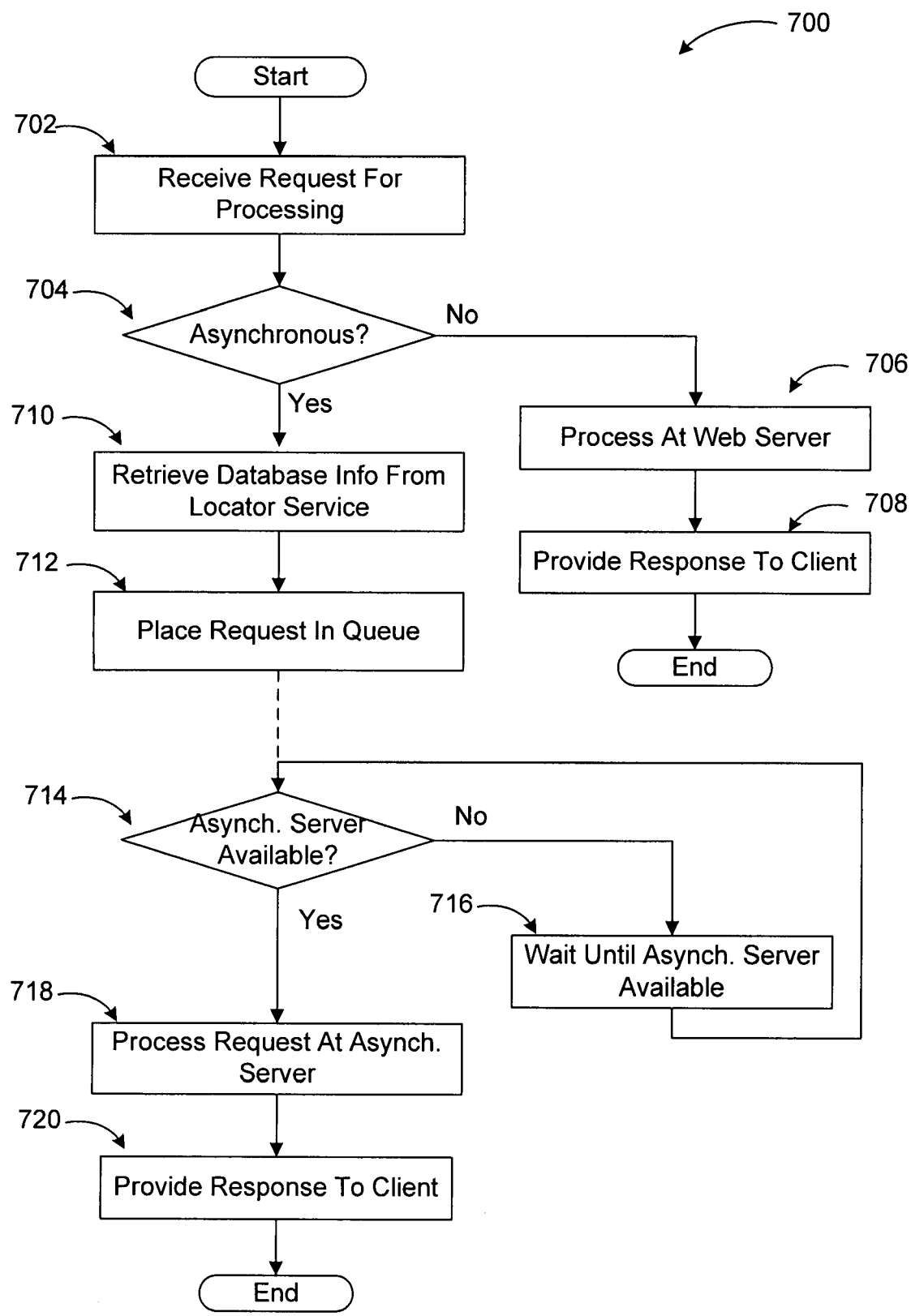
FIG. 7 illustrates a logic flow diagram for a process of managing asynchronous processing in a multi-tenant system.

FIG. 7 illustrates a logic flow diagram for process 700 of managing asynchronous processing in a multi-tenant system. Process 700 may be implemented as part of a CRM service.

Process 700 begins with operation 702, where a request for processing is received from a tenant. As described previously, tenants of a multi-tenant hosted service are typically associated with organizations each of which has a dedicated database within the system. Prior to receiving the request, the tenant may be provided credentials and information as to which web server it should contact from a discovery service associated with the multi-tenant hosted service. Processing advances from operation 702 to decision operation 704.

At decision operation 704, a determination is made whether the request is for synchronous processing or asynchronous processing. The determination may be based on user specified parameters, a type of the request (e.g. requests that require large amounts of data to be processed, extensive processing, and the like). If the request is for synchronous processing, the process advances to operation 706. Otherwise, processing moves to operation 710.

At operation 706, the synchronous processing is handled at the receiving web server. Processing moves from operation 706 to operation 708, where a response based on the result of processing the request is provided to the requesting tenant. After operation 708, processing moves to a calling process for further actions.

At operation 710, information regarding which organization database is to be used is retrieved from a locator service associated with the hosted service. Processing moves from operation 710 to operation 712, where the request is placed in a queue for the selected database. In some embodiments, the queue may be physically a part of the database. Processing moves from operation 712 to decision operation 714.

Once the asynchronous server is introduced to the client (request placed in asynchronous queue), the web server may return to the client and the web server portion of the process may end. As a separate process (as indicated by the dashed line connecting operation 712 and decision operation 714), the asynchronous processing is performed.

The asynchronous processing portion begins at decision operation 714, where a determination is made whether an asynchronous server is available to handle the request. If an asynchronous server is not available, processing moves to operation 716, where the service waits until an asynchronous server becomes available. Assignment of asynchronous servers may be determined using an algorithm as described above in conjunction with FIG. 4.

If an asynchronous server is available, processing advances to operation 718, where the assigned asynchronous server handles the request interacting with the assigned database. The interaction between the asynchronous servers and the databases is a distributed one allowing efficient distribution of workload and implementation of reliable recovery mechanisms. Processing moves from operation 718 to operation 720.

At operation 720, a response based on the result of processing the request is provided to the requesting tenant. In the case of asynchronous processing, the client is not held until the processing is completed. Instead, the client is released and enabled to poll at a later time to check on the progress of the asynchronous processing. After operation 720, processing moves to a calling process for further actions.

The operations included in process 700 are for illustration purposes. Providing scalable multi-tenant asynchronous processing may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for handling client requests in a multi-tenant environment, the method comprising:
   receiving a request from a client, wherein each client is associated with at least one organization;
   determining whether the request is for synchronous processing;
   if the request is for synchronous processing, handling the request at a receiving server and providing a response to the requesting client;
   if the request is for asynchronous processing:
   determining which organization database is applicable for the request;
   placing the request in a queue associated with the organization database;
   when an asynchronous server becomes available for the request in the queue, enabling the asynchronous server to pull the request from the queue, wherein a group of asynchronous servers and a group of organization databases interact in a distributed manner;
   enabling the client to poll at a later time to check a progress of asynchronous processing; and
   reassigning another asynchronous server to the organization database in response to a failure at the original asynchronous server such that handling of the request is recovered.

2. The method of claim 1, further comprising:
receiving information associated with a selection of the organization database for the request from a locator service.

3. The method of claim 2, further comprising:
providing information associated with the organization databases from the locator service to synchronous processing servers and asynchronous servers.

4. The method of claim 1, further comprising:
assigning the asynchronous server to the organization database based on an exponential back off for organizations without pending requests algorithm and a quota allocated to each organization based on historic load information for organizations with pending requests.

5. The method of claim 4, wherein the exponential back off algorithm is configured to assign a queue priority value to each organization that is used to prioritize assignment of asynchronous servers to requests from clients associated with each organization.

6. The method of claim 5, wherein the exponential back off algorithm is further configured to one of increment and decrement the queue priority value based on at least one from a set of: a number of pending requests, a number of request currently being processed, a capacity of available asynchronous servers, and a number of organizations without pending requests.

7. The method of claim 1, wherein the receiving server is selected among a group of web servers based on one of a random selection and a load balancing algorithm.

8. The method of claim 7, further comprising:
increasing a capacity of at least one of the group of web servers and the group of asynchronous servers based on a number and type of received requests.

9. A system for handling client requests in a multi-tenant environment, comprising:
   a group of web servers configured to:
   receive a request for processing from a client;
   determine whether the request is for synchronous processing;
   if the request is for synchronous processing, handle the request at a receiving server and provide a response to the requesting client; and
   if the request is for asynchronous processing, determine which organization database is applicable for the request and place the request in a queue associated with the organization database;
   a group of organization databases configured to store information for organizations participating in the multi-tenant environment, wherein each client is associated with at least one organization;
   a group of asynchronous processing servers configured to:

receive the request from the queue based on a prioritization algorithm; and process the request receiving data associated with the request from the organization database; and a locator service configured to provide information associated with a selection of a relevant organization database and a purpose of the service to be provided to the requesting client to at least one of the web servers and the asynchronous processing servers.

10. The system of claim 9, further comprising:

a discovery service configured to:

provide information associated with a web server arranged to receive the client request to the client; and provide a set of credentials to the client to be used by the system to identify the client and configure a service to be provided to the client.

11. The system of claim 9, wherein the group of web servers and the group of asynchronous processing servers are scalable.

12. The system of claim 9, wherein a queue associated with each organization database is within the organization database.

13. The system of claim 9, wherein the group of organization databases and the group of asynchronous processing servers interact in a distributed manner.

14. The system of claim 9, wherein a web server to receive the client request is selected among the group of web servers based on one of a random selection and a load balancing algorithm.

15. A computer-readable storage medium with instructions stored thereon for handling user requests in a multi-tenant hosted business application environment, the instructions comprising:

receiving a request for processing from a user by a web server based on a selection among a group of web servers employing one of a random selection and a load balancing algorithm;

determining whether the request is for synchronous processing;

if the request is for synchronous processing, handling the request at the web server and providing a response to the requesting user;

if the request is for asynchronous processing, determining an applicable organization database for the request based on information received from a locator service and placing the request in a queue associated with the organization database;

providing the request from the queue to an asynchronous server based on a prioritization algorithm;

processing the request at the asynchronous server using data from the organization database; and enabling the asynchronous server to pull the request from the queue based on a quota allocated to each organization depending on historic load information for organizations with pending requests in addition to the prioritization algorithm.

16. The computer-readable storage medium of claim 15, wherein the prioritization algorithm is configured to determine a priority for each queue by one of incrementing and decrementing a default priority value based on at least one from a set of: a number of pending requests, a number of request currently being processed, a capacity of available asynchronous servers, and a number of organizations without pending requests.

17. The computer-readable storage medium of claim 15, wherein the instructions further comprise:

reassigning another asynchronous server to the organization database in response to a failure at the original asynchronous server such that handling of the request is recovered transparently to the requesting user.

* * * * *